United States Patent Office 3,022,306
Patented Feb. 20, 1962

---

3,022,306
2-TRIFLUOROACETAMIDO-5-NITROPYRIMIDINE
Richard E. Strube, Kalamazoo, Mich., assignor to The Upjohn Company, Kalamazoo, Mich., a corporation of Delaware
No Drawing. Substituted for abandoned application Ser. No. 686,601, Sept. 27, 1957. This application Aug. 5, 1960, Ser. No. 47,580
1 Claim. (Cl. 260—256.4)

The present invention relates to a new compound, 2-trifluoroacetamido-5-nitropyrimidine, useful in the treatment of infections caused by protozoans generally and particularly to infections caused by the protozoan *Trichomonas vaginalis*.

*Trichomonas vaginalis*, a parasitic protozoan, infests the human vagina and is the etiological agent of a very troublesome and prevalent form of vaginal infestation known as *Trichomonas vaginalis* vaginitis.

Various substances have been topically applied to the vaginal mucosa in the treatment of *Trichomonas vaginalis* vaginitis, but all have been subject to numerous limitations and disadvantages.

It is an object of the present invention to provide a new therapeutic compound which can be used topically without the attendant difficulties encountered in the use of substances heretofore.

It is a further object of the instant invention to provide a new therapeutic compound which can be used systemically.

It is a further object of the instant invention to provide a compound which can be administered orally.

Other objects of the invention will be apparent to those skilled in the art to which this invention pertains.

The use of 5-nitropyrimidines to combat infections caused by protozoan organisms is known in the art. U.S. Patent 2,531,756 discloses the use of 2-acetamido-5-nitropyrimidine as an anti-protozoic agent. It has now been found that the aforesaid fluorine derivative of 2-acetamido-5-nitropyrimidine exhibits a more pronounced inhibitory effect on *Trichomonas vaginalis* than the parent compound as shown by the following table:

*Inhibition of Trichomonas vaginalis in vitro*

|  | 95% Inhibition, γ/ml. | 95% Inhibition, micromoles/l. |
|---|---|---|
| 2-trifluoroacetamido-5-nitropyrimidine | 3.1 | 13 |
| 2-acetamido-5-nitropyrimidine | 6.2 | 33 |

From the table it is clearly evident that the fluorinated compound of the instant invention is two times as effective on a weight basis, and two and one-half times as effective on a mole basis, in the inhibition of *Trichomonas vaginalis* as the parent compound.

The new therapeutic compound of this invention is prepared by reacting 2-amino-5-nitropyrimidine with a trifluoroacetyl acylating agent such as trifluoroacetic acid, its acid halides, anhydrides, and its esters, including its thio-acid esters.

Advantageously, the reaction between the base and the trifluoroacetyl acylating agent is carried out in an excess of said acylating agent, or in the presence of an inert solvent such as benzene or toluene.

One of the preferred methods of producing the novel compound of this invention is to treat 2-amino-5-nitropyrimidine with an excess of trifluoroacetic anhydride at the reflux temperature of the mixture.

The following example is illustrative of the production of the compound of the present invention, but is not to be construed as limiting.

EXAMPLE

*Preparation of 2-trifloroacetamido-5-nitropyrimidine*

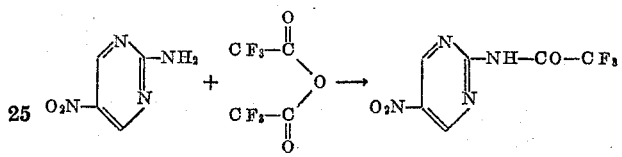

In a 250-ml., three necked, round bottomed flask, provided with a stirrer, a dropping funnel and a reflux condenser there was placed fourteen grams of 2-amino-5-nitropyrimidine. There was then added 100 ml. of trifluoroacetic anhydride. The mixture was stirred and heated on the steam bath at reflux temperature for three hours. The mixture was then cooled to room temperature, the product removed by filtration and recrystallized from toluene. There was obtained 12.9 grams of almost colorless crystals of 2-trifluoroacetamido-5-nitropyrimidine melting at 131–133.5° C.

*Analysis.*—Calcd. for $C_6H_3F_3N_4O_3$: C, 30.52; H, 1.28; N, 23.73. Found: C, 30.45; H, 1.28; N, 23.50.

The novel compound of the instant invention can be formulated in accordance with U.S. Patent 2,735,798 and British Patent 747,273. In the formulations disclosed in these patents the 2-acylamino-5-nitrothiazoles can be replaced by the 2-trifluoroacetamido-5-nitropyrimidine of this invention.

This application is a substitute for U.S. application Serial No. 686,601, filed September 27, 1957, now abandoned.

I claim:
2-trifluoroacetamido-5-nitropyrimidine.

References Cited in the file of this patent
UNITED STATES PATENTS
2,531,756     Waletsky et al. ———————— Nov. 28, 1950